United States Patent [19]

Van De Mark

[11] 4,117,857
[45] Oct. 3, 1978

[54] FUEL CONTROL SYSTEM FOR A PRIME MOVER

[75] Inventor: Garin M. Van De Mark, Fort Collins, Colo.

[73] Assignee: Woodward Governor Company, Rockford, Ill.

[21] Appl. No.: 753,262

[22] Filed: Dec. 22, 1976

[51] Int. Cl.² ..................... F02C 9/10; G05D 11/00
[52] U.S. Cl. ........................ 137/117; 60/39.28 R
[58] Field of Search ............... 60/39.28 R; 137/116, 137/116.3, 116.5, 117

[56] References Cited

U.S. PATENT DOCUMENTS

| | | | |
|---|---|---|---|
| 2,980,173 | 4/1961 | Perkey | 137/117 |
| 3,246,682 | 4/1966 | McCombs, Jr. | 60/39.28 R |
| 3,769,791 | 11/1973 | Lewis | 60/39.28 R |
| 3,898,795 | 8/1975 | Barker | 60/39.28 R |

Primary Examiner—Martin P. Schwadron
Assistant Examiner—A. Michael Chambers
Attorney, Agent, or Firm—Leydig, Voit, Osann, Mayer & Holt

[57] ABSTRACT

The flow rate of fuel to a gas turbine engine is controlled by a pivoted flapper valve which lacks the ability to shut off all flow of fuel to the engine. A secondary valve comensates for the inability of the flapper valve and shuts off the fuel flow when the flapper valve is moved to a closed but leaking position.

4 Claims, 1 Drawing Figure

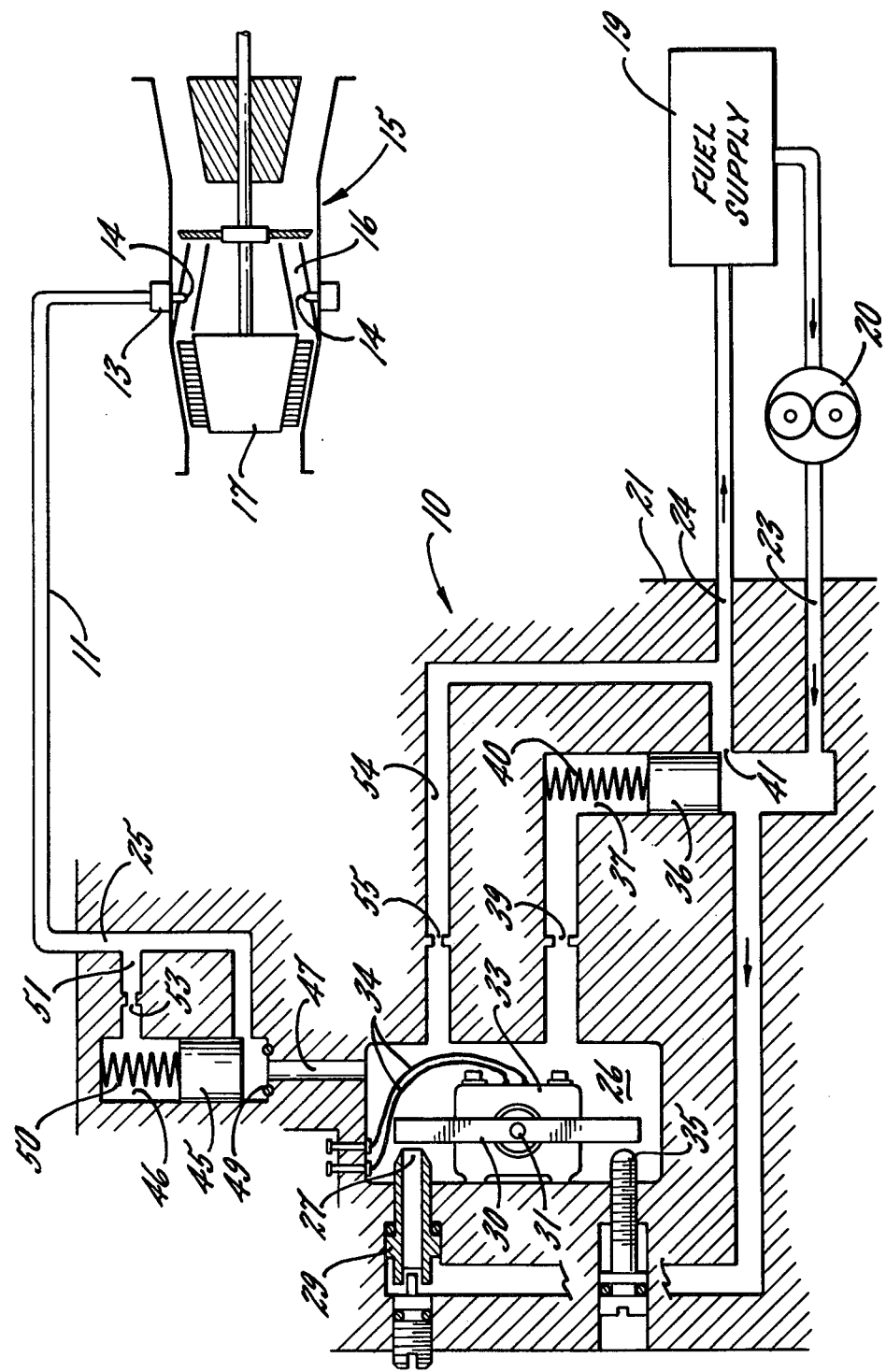

FUEL CONTROL SYSTEM FOR A PRIME MOVER

BACKGROUND OF THE INVENTION

This invention relates to a system for controlling the flow of fuel to a prime mover such as a gas turbine engine. More particularly, the invention relates to a system in which the fuel is metered to the prime mover through a valve orifice whose effective area is controlled by a movable valve member such as a flapper valve. In the present system, the flapper valve is adapted to be pivoted by an electrical actuator and is adapted to increase and decrease the effective area of the orifice to vary the rate of fuel flow to the prime mover. The electrical actuator is adapted to be energized by a source of variable voltage whose magnitude is controlled by the throttle setting of the prime mover. The system is designed such that the rate of fuel flow varies substantially as a linear function of the voltage applied to the actuator.

With certain gas turbine engines, there is a requirement that all fuel flow to the engine be cut off for short periods of time when, for example, the compressor of the engine is being used to effect dynamic braking. A pivoted flapper valve, however, is virtually incapable of completely closing off the metering orifice unless very expensive and special manufacturing techniques are used to match the flapper valve with the orifice. Even then, some leakage might occur through the orifice.

SUMMARY OF THE INVENTION

The primary aim of the present invention is to provide a new and improved fuel control system of the foregoing character in which a secondary valve member automatically cuts off all fuel flow to the prime mover when the main valve member or flapper valve is closed sufficiently far to reduce the flow rate through the metering orifice to below a predetermined value.

A more detailed object is to achieve the foregoing through the provision of a system in which the fuel is metered to the prime mover by way of a chamber in which the main valve member is located. The secondary valve member is positioned adjacent the outlet of the chamber and is biased toward a position closing the outlet. The secondary valve member is, however, exposed to the pressure in the chamber and is held in an open position by such pressure as long as the flow rate into the chamber is greater than the flow of fuel from a bleed passage leading out of the chamber. When the main valve member is closed to reduce the incoming flow rate to below a predetermined value, the pressure in the chamber is relieved through the bleed passage to enable the secondary valve member to snap shut and cut off all flow of fuel out of the chamber and to the prime mover.

The invention also resides in a fuel control system in which an electric actuator positions a flapper valve and controls fuel flow as a substantially linear function of the voltage applied to the actuator and in which a secondary valve member in the form of a piston snaps shut against a resilient valve seat and cuts off all flow of fuel to the prime mover when the fuel flow past the flapper valve is substantially cut off.

These and other objects and advantages of the invention will become more apparent from the following detailed description when taken in conjunction with the accompanying drawings.

BRIEF DESCRIPTION OF THE DRAWINGS

The single FIGURE of the drawings is a schematic view showing a new and improved fuel control system which incorporates the unique features of the present invention.

DETAILED DESCRIPTION OF THE PREFERRED EMBODIMENT

In the drawings, the improved fuel control system 10 of the present invention is shown as especially adapted for use in regulating the flow rate of pressurized liquid fuel to a line 11 leading to the manifold 13 for the burner nozzles 14 of a prime mover such as a gas turbine engine 15 having a combustion chamber 16 and adapted to drive a rotary compressor 17. The engine may, for example, be used in a truck or other land vehicle to propel the vehicle.

Fuel for the engine 15 is contained in a tank 19 and is pressurized and delivered to the engine by means such as a positive displacement gear pump 20 which may be driven by the engine. The fuel is supplied to the line 11 by way of a valve assembly having a casing 21 formed with a supply passage 23 communicating with the pump 20, a drain passage 24 communicating with the tank 19 and an outlet passage 25 communicating with the line 11.

In the fuel system 10 of the present invention, the fuel flows from the supply passage 23 to the outlet passage 25 via a chamber 26 which is formed in the casing 21. The fuel enters the chamber through an inlet defined by an orifice 27 at the tip of a fuel metering nozzle 29 supported by the casing and located with its tip projecting into the chamber. The nozzle 29 communicates with the supply passage 23 and thus fuel is delivered into the chamber through the inlet orifice 27.

To control the rate of fuel flow, a main valve member 30 is located in the chamber 26 and is adapted to be moved to change the effective area of the orifice 27, such area being changed as a substantially linear function of the position of the valve member. Herein, the main valve member 30 is in the form of a flat flapper whose upper end is adapted to pivot toward and away from the orifice 27. The flapper 30 is connected at its midpoint to the rotatable armature 31 of a reversible electrical actuator which is here shown as an electric torque motor 33 having its field connected by leads 34 to a dc. voltage source (not shown). The voltage applied to the torque motor may be varied in magnitude and polarity by changing the setting of the throttle control for the engine 15 and, when the voltage is within a predetermined range, the torque motor causes the position of the flapper to vary as a substantially linear function of the voltage. When the flapper is substantially closed and is engaging the nozzle 29, further changes in the control voltage do not, of course, move the flapper further in a closing direction. Also, an adjustable stop 35 is supported by the casing 21 and engages the lower end portion of the flapper to limit movement of the flapper in the opening direction.

Whenever fuel is flowing to the engine 15, a substantially constant pressure drop is maintained across the inlet orifice 27 in order to prevent the flow rate through the orifice from changing when variations occur in the pressures in the supply passage 23 and in the chamber 26. As a result of maintaining a constant pressure drop across the orifice, the flow rate through the orifice varies as a substantially linear function of changes in the effective area of the orifice. Since the effective area varies as a substantially linear function of the position of the flapper 30 and since the flapper position, in turn, varies as a substantially linear function of the voltage applied to the torque motor 33, the rate of fuel flow also varies as a substantially linear function of such voltage as long as the voltage is within such a range that the flapper 30 is neither stopped against the nozzle 29 or engaged by the stop 35.

To maintain the constant pressure drop across the inlet orifice 27, a valve plunger 36 is slidably mounted in a passage 37 formed in the casing 21 and communicating with the chamber 26, there being a restriction 39 in the passage 37 to dampen oscillation of the plunger. A spring 40 is seated against the upper end of the plunger 36 and acts in conjunction with the pressure in the passage 37 to bias the plunger downwardly toward a position in which the lower end portion of the plunger tends to close off a bypass port 41 which establishes communication between the supply passage 23 and the drain passage 24. The pressure in the supply passage 23 acts against the lower end of the plunger and tends to shift the plunger upwardly to open the bypass port 41 so that some of the fuel in the supply passage returns directly to the drain passage 24 rather than being delivered into the chamber 26. The plunger normally is positioned such that sufficient fuel is bypassed to the drain passage to maintain a pressure drop of about 30 p.s.i. across the inlet orifice 27. If the pressure in the supply passage 23 increases or decreases, the plunger opens or closes to bypass more or less fuel and thereby keep the pressure of the fuel supplied to the chamber at a substantially constant magnitude. If the pressure in the chamber 26 increases or decreases, the plunger closes or opens to decrease or increase the pressure of the fuel supplied to the chamber and thereby maintain the constant pressure drop across the inlet orifice 27.

When the engine 15 is used, for example, in a truck, the supply of fuel to the burner nozzles 14 and the combustion chamber 16 is completely cut off when the truck is traveling down long hills, the compressor 17 then being used to effect dynamic braking. The flapper valve 30, however, is virtually incapable of completely closing the orifice 27 and shutting off all flow of fuel to the chamber 26. That is to say, there is no elastomeric seal between the flapper valve 30 and the tip of the metering nozzle 29 and, when these parts are made by standard manufacturing techniques, the surfaces of the nozzle and the pivoted flapper valve will not mate with such perfection as to prevent fuel from leaking through the inlet orifice 27 and into the chamber 26. Thus, the flapper valve cannot be relied upon to completely cut off the supply of fuel to the engine 15.

In accordance with the present invention, a secondary valve member 45 is associated with the chamber 26 and automatically closes the outlet passage 25 to cut off all fuel flow to the engine 15 when the flapper valve 30 is substantially closed and the flow rate through the inlet orifice 27 is reduced below a predetermined value. As a result of the secondary valve member 45, the fuel flow to the engine can be completely shut off even though fuel leaks past the flapper valve 30 when the latter is in full engagement with the metering nozzle 29.

In the present instance, the secondary valve member 45 is in the form of a piston which is slidably mounted in a cavity 46 formed in the casing 21. The lower end portion of the cavity establishes communication between the outlet passage 25 and another passage 47 leading from the chamber 26 and defining the outlet of the chamber. The piston 45 is exposed at its lower end to the pressure in the chamber 26 and such pressure normally is sufficiently high to hold the piston in a position permitting fuel to flow from the passage 47 to the passage 25. The piston 45 is, however, biased downwardly toward a closed position and, when the piston is shifted to that position, its lower end engages and seals against a resiliently yieldable valve seat which herein is defined by elastomeric O-ring 49. The O-ring is seated in a circular groove formed in the bottom wall of the cavity 46 and extending around the upper end of the passage 47. When the lower end of the piston 45 engages the yieldable O-ring 49, a very good seal is established so as to close off the chamber 26 and prevent any fuel from flowing to the engine 15.

To bias the piston 45 toward its closed position, a spring 50 is disposed in the upper end portion of the cavity 46 and bears against the upper end of the piston. In addition, pressure from the outlet passage 25 is transmitted to the upper end of the piston via a passage 51 extending between the outlet passage 25 and the upper end portion of the cavity 46 and having a damping restriction 53 therein. The piston thus functions in a manner similar to the plunger 36 and normally serves to maintain a substantially constant differential between the pressure in the passage 47 and the pressure in the passage 25, that differential being approximately 25 p.s.i. in the present instance. Also, any fuel seeping past the piston 45 and into the upper end portion of the cavity 46 is ultimately delivered to the engine 15 by way of the passage 51 and thus it is not necessary to vent the upper end of the cavity to the tank 19 in order to remove such fuel from the cavity.

In carrying out the invention, fuel is bled continuously from the chamber 26 so that the pressure therein may be relieved to permit the piston 45 to close when the flow through the inlet orifice 27 drops below a predetermined rate. For this purpose, a bleed passage 54 is formed in the casing 21 and leads from the chamber 26 to the drain passage 24. A restricted orifice 55 is located in the bleed passage 54 to limit the flow of fuel from the chamber.

With the foregoing arrangement, fuel is bled continuously from the chamber 26 through the bleed passage 54 but the pressure in the chamber remains sufficiently high to hold the piston 45 in its open position as long as the flapper valve 30 is open sufficiently far that the flow into the chamber through the inlet orifice 27 exceeds the flow out of the chamber through the bleed passage 54. Thus, fuel is delivered to the engine 15 through the passages 47 and 25 at a rate determined by the position of the flapper. But, when the flapper fully engages the metering nozzle 29 and reduces the flow through the inlet orifice 27 to below a predetermined rate, the flow through the bleed passage 54 vents the pressure in the chamber 26 and causes that pressure to fall virtually to zero. When the pressure in the chamber is relieved, the spring 50 snaps the piston 45 downwardly against the O-ring 49 to close off the passage 47 and completely cut off the flow of fuel to the engine 15 even though fuel is leaking past the flapper 30 and into the chamber 26.

From the foregoing, it will be apparent that the present invention brings to the art a new and improved fuel control system 10 in which the fuel supply to the engine 15 normally is metered and controlled by the pivoted flapper valve 30 in accordance with the magnitude of the voltage applied to the torque motor 33. The piston 45 overcomes the inability of the flapper valve to close completely and enables the flow of fuel to the engine to be completely shut off in spite of the leakage through the orifice 27 which is controlled by the flapper.

I claim:

1. A system for supplying fuel to a prime mover, said system comprising a chamber having an inlet and an outlet, said outlet being connected to communicate with said prime mover, means for delivering pressurized fuel into said chamber through said inlet, means for maintaining a substantially constant pressure drop across said inlet when fuel is flowing into said inlet and out of said outlet, a flapper valve supported to pivot within said chamber, means for moving said flapper valve between different positions in which said flapper valve changes the effective area of said inlet thereby to vary the rate of fuel flow into said chamber, the effective area of said inlet varying as a substantially linear function of the position of said flapper valve, a valve member, means biasing said valve member toward a position closing said outlet, a resiliently yieldable seal, said seal being compressed when said valve member is in a position closing said outlet and serving to prevent the flow of fuel from said chamber through said outlet, said valve member being exposed to the pressure in said chamber with said pressure being effective to overcome said biasing means and to hold said valve member in a position opening said outlet as long as said pressure equals or exceeds a predetermined value, and a passage leading from said chamber for bleeding fuel out of said chamber and effective to cause the pressure in said chamber to fall below said predetermined value when said flapper valve is positioned to reduce the fuel flow through said inlet below a predetermined rate whereby said biasing means shift said valve member to a position closing said outlet and compressing said seal to cut off all flow of fuel to said prime mover.

2. A system as defined in claim 1 in which said moving means comprise an electrical actuator adapted to be energized by a variable voltage and connected to said flapper valve to change the position of the latter as a substantially linear function of said voltage as long as said voltage is within a predetermined range.

3. A system as defined in claim 1 in which said seal is defined by a resiliently yieldable valve seat located adjacent said outlet, said valve member comprising a piston, said biasing means acting on said piston and urging the piston toward sealing engagement with said valve seat.

4. A system for supplying fuel to a prime mover, said system comprising a chamber having an inlet and an outlet, said outlet being connected to communicate with said prime mover, means for delivering pressurized fuel into said chamber through said inlet, a flapper valve disposed within said chamber and adapted to be pivoted to different positions changing the effective area of said inlet with such area varying as a substantially linear function of the position of said flapper valve, an electrical actuator adapted to be energized by a variable voltage and connected to said flapper valve to change the position of the latter as a substantially linear function of said voltage as long as said voltage is within a predetermined range, means for maintaining a substantially constant pressure drop across said inlet regardless of the position of said flapper valve as long as said voltage is within said range whereby the rate of fuel flow into said chamber also varies as a substantially linear function of said voltage as long as the latter is within said range, a resiliently yieldable valve seat located adjacent said outlet, a piston, means biasing said piston toward sealing engagement with said valve seat to close said outlet, said piston being exposed to the pressure in said chamber with such pressure being effective to overcome said biasing means and to hold said piston out of sealing engagement with said valve seat as long as said pressure equals or exceeds a predetermined value, and a restricted passage leading from said chamber for bleeding fuel out of said chamber and effective to cause the pressure in said chamber to fall below said predetermined value when said flapper valve is positioned to reduce the fuel flow through said inlet below a predetermined rate whereby said biasing means shift said piston into sealing engagement with said valve seat to close said outlet and cut off all flow of fuel to said prime mover even though fuel continues to flow into said chamber through said inlet.

* * * * *